United States Patent
Zhou et al.

(10) Patent No.: US 10,889,518 B2
(45) Date of Patent: Jan. 12, 2021

(54) USE OF AN INORGANIC SALT OR ACID IN REDUCING THE HARDNESS AND/OR ALKALINITY OF A WATER SYSTEM

(71) Applicant: ECOLAB USA INC., St. Paul, MN (US)

(72) Inventors: Yue Ming Zhou, Shanghai (CN); Jian Kun Shen, Shanghai (CN); Yin Yin Tong, Shanghai (CN); Ling Feng Han, Shanghai (CN)

(73) Assignee: ECOLAB USA INC., St. Paul, MN (US)

( * ) Notice: Subject to any disclaimer, the term of this patent is extended or adjusted under 35 U.S.C. 154(b) by 154 days.

(21) Appl. No.: 15/646,445

(22) Filed: Jul. 11, 2017

(65) Prior Publication Data
US 2018/0016172 A1    Jan. 18, 2018

(30) Foreign Application Priority Data

Jul. 15, 2016  (CN) .......................... 2016 1 0560546

(51) Int. Cl.
*C02F 5/04*    (2006.01)
*C02F 1/56*    (2006.01)
*C02F 103/02*  (2006.01)

(52) U.S. Cl.
CPC .................. *C02F 5/04* (2013.01); *C02F 1/56* (2013.01); *C02F 2103/023* (2013.01)

(58) Field of Classification Search
CPC ......... C02F 1/56; C02F 5/04; C02F 2103/023
See application file for complete search history.

(56) References Cited

U.S. PATENT DOCUMENTS

| 4,707,270 A | 11/1987 | Kobayashi et al. |
| 2011/0017677 A1 | 1/2011 | Evans |
| 2011/0159115 A1 | 6/2011 | Speronello et al. |
| 2012/0168364 A1* | 7/2012 | Evans ................... C02F 1/5236 210/202 |

FOREIGN PATENT DOCUMENTS

| CN | 1073415 A | 6/1993 |
| CN | 1254441 A | 5/2000 |
| CN | 1579962 A | 2/2005 |
| CN | 1749185 A | 3/2006 |

(Continued)

OTHER PUBLICATIONS

CDC NMWR report, Jul. 29, 1995.*

(Continued)

*Primary Examiner* — Krishnan S Menon
(74) *Attorney, Agent, or Firm* — Eric D. Babych; Barnes & Thornburg LLP (57) ABSTRACT

The present invention provides a use of an inorganic salt or acid capable of producing free phosphate or fluoride ion in reducing the hardness and/or alkalinity of a water system containing residual antiscalant. In the lab test, it is found that the addition of a suitable amount of sodium phosphate or sodium fluoride may induce alkalinity reduction as well as hardness reduction. The production efficiency can be enhanced since the scaling was relieved and heat exchange efficiency can be improved. Meanwhile, lower scaling stress also means lower antiscalant dosage and cost, and thus the total operation cost can be reduced.

10 Claims, 5 Drawing Sheets

(56) References Cited

FOREIGN PATENT DOCUMENTS

| | | | |
|---|---|---|---|
| CN | 102079601 A | 6/2011 | |
| CN | 102285722 A | 12/2011 | |
| CN | 102634323 A | 8/2012 | |
| CN | 102787025 A | 11/2012 | |
| CN | 102876574 A | 1/2013 | |
| CN | 102924972 A | 2/2013 | |
| CN | 103086491 A | 5/2013 | |
| CN | 103086522 A | 5/2013 | |
| CN | 103821030 A | 5/2014 | |
| CN | 103848518 A | 6/2014 | |
| CN | 104085025 A | 10/2014 | |
| CN | 104230010 A | 12/2014 | |
| CN | 104286194 A | 1/2015 | |
| CN | 104384642 A | 3/2015 | |
| CN | 104403778 A | 3/2015 | |
| CN | 104891686 A | 9/2015 | |
| DE | 877594 | 5/1953 | |
| DE | 102012001792 A1 * | 8/2013 | ............ G01N 27/10 |
| EP | 1541531 A1 | 6/2005 | |
| IN | 524/MAS/1997 | 6/2008 | |
| JP | 172427 | 3/1948 | |
| JP | 498536 B1 | 2/1974 | |
| JP | S 5861895 A | 4/1983 | |
| JP | S 62192591 A | 8/1987 | |
| JP | 10258291 A | 9/1998 | |
| KR | 20100092677 A | 8/2010 | |
| RU | 2033396 C1 | 4/1995 | |
| RU | 2149826 C1 | 5/2000 | |
| RU | 2162438 C1 | 1/2001 | |
| SU | 558952 A1 | 5/1977 | |
| SU | 647250 A1 | 2/1979 | |
| SU | 1116024 A1 | 9/1984 | |
| SU | 1590445 A1 | 9/1990 | |
| SU | 1636346 A1 | 3/1991 | |
| WO | WO 93/12041 A1 | 6/1993 | |
| WO | WO 98/49723 A1 | 11/1998 | |

OTHER PUBLICATIONS

Batley, R.L. et al., "Chemical control of softening plants," Engineering and Boiler House Review, (1937) 51(1): 62.
Bouson, Frank W., "Lime-soda ash process of water softening (at South Pittsburgh)," U.S. Pub. Health Eng. Abstracts, (Feb. 13, 1932), 12, W, 30. English Abstract only.
Carrero, Jaime Gonzales et al., "Sodium metaphosphate as softening agent for laundry water," *Anales de Fisica y Quimica*, (1945) 41: 613-633. English Abstract only.
Cliffe, W.R. et al., "Calcination of carbonate sludge," Rock Products, (1950) 53(3): 106-110.
Dobreva, P. et al., "Chemical treatment of recycled waters for the converter at the Kremikovtsi Metal Works," *Metalurgiya* (Sofia), (1974) 29(4): 3-6 (with English Abstract).
"Engineering and Administrative Recommendations for Water Fluoridation, 1995," CDC Morbidity and Mortality Weekly Report, (Sep. 29, 1995) 44(RR-13): 46 pages.
Germain, Louis, "The softening of industrial waters by trisodium phosphate," *Revue de Chimie Industrielle et le Moniteur Scientifique de Quesneville Reunis* (Paris), (1936) 45: 7-13. English Abstract only.
Gonni, M., "Bursting of boiler tubes caused by siliceous incrustatins," *Chimie et Industrie* (Paris), (1938) 40: 885. English Abstract only.
Hoover, Charles P., "Iron-removal and zeolite-softening plant at Lancaster, Ohio," Public Works, (1933) 64(6): 9-11. English Abstract only.
Hoppner, Kurt, "Analytical determinations necessary to control the softening of boiler feed water with trisodium phosphate," *Deutsche Zuckerindustrie*, (1936) 61: 132-133. English Abstract only.

Jeannet, "Softening of industrial (process) water by means of trisodium phosphate," TIBA, (1935) 13: 261, 263, 337, 339, 341, 419, and 421. English Abstract only.
Krasnoshchekov, V.V. et al., "Possibilities using industrial waste waters in a return water supply system," *Doklady TSKhA*, (1976) 218: 201-207 (with English Abstract).
Kroemer, F., "The combination of trisodium phosphate with other softening chemicals," *Chemiker-Zeitung*, (1932) 56: 411-412. English Abstract only.
Kroemer, F., "The use of trisodium phosphate in boiler operation without special softening plants," *Chemiker-Zeitung*, (1932) 56: 722-724. English Abstract only.
Leich, J., "New treatment of boiler feed water-trisodium phosphate as a water softener," *Neues Jahrbuch fuer Mineralogie, Geologie und Palaeontologie, Abhandlungen, Abteilung A: Mineralogie, Petrographie*, (Referate II), (1937) 94-95. English Abstract only.
Leich, J., "New treatment of boiler feed water-trisodium phosphate as a water softener," *Schlagel v. Eisen*, (1933) 31: 32-34. English Abstract only.
Leick, J., "Treatment of locomotive feed water," *Werkstoffe und Korrosion*, (1950) 1: 64-67. English Abstract only.
Matthews, F.J., "Water-circulation softening," Water Pollution Research, Summary Current Lit. (1944) 17: 111-112. English Abstract only.
Mycielski, H. et al., "Preparation of water from sulfur mining for reheating in closed systems," *Prace Naukowe Politechniki Szczecinskiej*, (1979) 123: 169-182. English Abstract only.
Niezoldi, Otto, Preparation of feed water (for boilers), *Zellstroff und Papier* (Leipzig), (1939) 19: 219-220. English Abstract only.
"Norfolk and Western builds large water-treating plant," Railway Review, (1926), 79(16): 609-610.
Pennink, J.A., "Chemical-technical treatment of the water of the Vaal River for industrial use and for use as boiler feed water," *Polytech Weekblad*, (1940) 35: 396-398. English Abstract only.
Riere, Joseph, "How can the shortage of chemical products be met?," Teintex, (1941), 6: 32-36. English Abstract only.
Schmidt, R., "The hardness of water, its importance and removal, with special reference to boiler feed water. II. Softening with chemical precipitants," *Kleine Mitt. Mitglieder Ver. Wasser-, Boden-, Lufthyg*, (1935) 11: 142. English Abstract only.
Shablii, T.A. et al., "Development of an efficient water softening process for industrial water use," *Energotekhnologii i Resursosberezhenie*, (2010) 1: 53-58. English Abstract only.
Simpson, A.D., "Hot lime zeolite, a 287° F. installation," *Combustion* (New York, 1929), (1952) 23(12): 49-51. English Abstract only.
Splittgerber, A., "Operating results of a tube water-softening plant," *Archiv fuer Waermewirtschaft und Dampfkesselwesen*, (1937) 18: 301-305 (with English Abstract).
Splittgerber, A., "Some questions arising in the treatment of boiler feed water," *Vom Wasser*, (1932) 6: 2013-214. English Abstract only.
Splittgerber, A., "Testing of the coil type softening plant of the Chemische Farbik Bundenheim A.-G. in Mayence, D.R.P. 625184, 629729, and 620500," *Vom Wasser*, (1937) 12: 341-365. English Abstract only.
Subramanyan, N. et al., "Some aspects of boiler corrosion and its prevention," Indian Chemical Manufacturer, (1974) 12(2): 9-14.
Totsche, Oliver et al., "Microbial Alkalinity Production to Prevent Reacidification of Neutralized Mining Lakes," Mine Water and the Environment, (2006) 25: 204-213.
Varka, Josef, "Chemical and physicochemical aspects of the closed water circuit," *Papier* (Bingen, Germany), (1976) 30(3): 89-97. English Abstract only.
Yildiz, Al., "Preparation of soft water for cement-plant steam plants," *Cimento Bulteni*, (1988) 25(254): 1-14. English Abstract only.
Zaitsev, S., "A water-softening plant for field use," *Tekh. i Booruzhenie*, (1939) 8(10): 26-36. English Abstract only.

* cited by examiner

USE OF AN INORGANIC SALT OR ACID IN REDUCING THE HARDNESS AND/OR ALKALINITY OF A WATER SYSTEM

TECHNICAL FIELD

The present disclosure generally relates to water treatment. More specifically, the disclosure relates to reducing hardness and/or alkalinity of water.

BACKGROUND

Water is used in the coal gasification industry for gas production and cleaning. The water is recycled and reused in systems having high temperatures, such as about 80 to about 240° C. The systems also have a high suspended solids (SS) content. In the processes, anti-scalant and/or dispersant reagents are used to alleviate scaling and/or deposition in pipes, and flocculants are used for clarification to remove the suspend solids.

Figure 1:
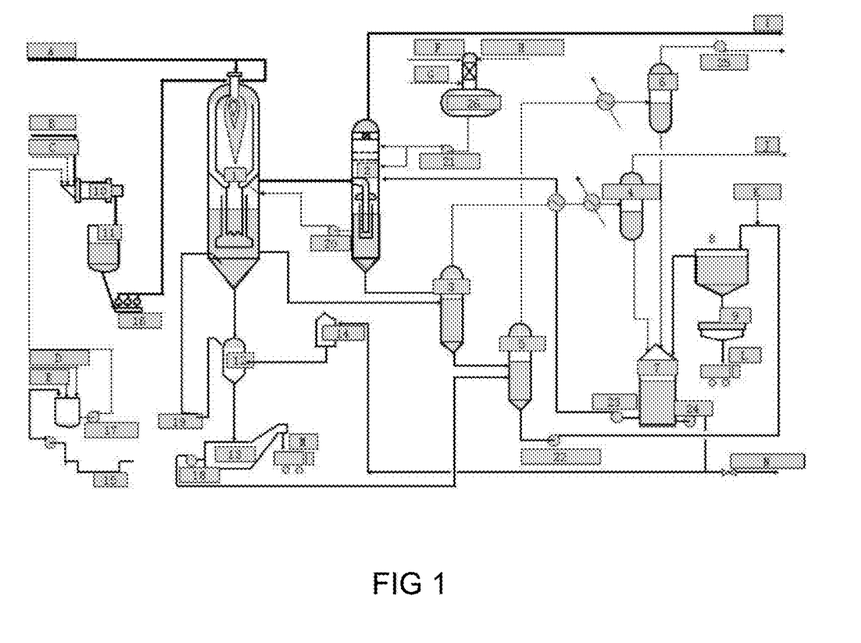
FIG. 1 is a diagram of a typical gasification process.

A typical gasification process is shown in FIG. 1. High pressure/temperature water from the furnace is cooled and decompressed. A flocculant is then added before the water enters into a sediment tank. The discharge water from the supernatant of the sediment tank enters into the grey water tank, with the addition of the anti-scalant and/or dispersant reagents at the inlet or the outlet of the grey water tank. The grey water is then recycled by increasing the temperature and pressure.

Even if a large amount of anti-scalants and/or dispersants are applied, the scaling/deposition is generally still severe for the coal gasification system because of high scaling stress and high SS. Plant operators need to stop production every few months to clean the pipes/pumps in the system.

BRIEF SUMMARY

In some embodiments, the present disclosure is directed to a method of reducing the hardness and/or alkalinity of water. The water contains residual anti-scalant. The method comprises adding a composition capable of delivering a phosphate ion or a fluoride ion to the water. The composition may comprise an inorganic salt or an acid, for example.

In accordance with the present disclosure, residual anti-scalant is defined as an amount of anti-scalant above 0 ppm and below about 20 ppm.

In some embodiments, the water is contained in a water system, such as a gasification black water system, a cooling tower water system, a boiler water system, or a reverse osmosis water system.

In certain embodiments, the gasification black water system may be a gasification black water system from the coal gasification industry.

In some embodiments, the inorganic salt may be selected from sodium salts or potassium salts capable of producing a free phosphate or fluoride ion.

In some embodiments, the inorganic salt may be selected from the group consisting of sodium phosphate, disodium phosphate, monosodium phosphate, sodium fluoride, potassium phosphate, dipotassium phosphate, monopotassium phosphate, potassium fluoride, and any combination thereof.

In certain embodiments, the acid may be phosphoric acid.

In some embodiments, the amount of the inorganic salt or acid added to the water may be from about 1 ppm to about 500 ppm, such as about 20 ppm to about 100 ppm or about 40 ppm to about 60 ppm.

In some embodiments, a flocculant may be added to the water. The flocculant may be added before, after, and/or with the inorganic salt or acid.

The amount of flocculant that can be added is not limited. In some embodiments, about 1 ppm to about 5 ppm of a flocculant is added, based on the weight of the water.

In certain embodiments, the flocculant may comprise anionic and/or cationic polyacrylamide (PAM).

In some embodiments, the water may have a temperature from about 0° C. to about 100° C.

In at least one embodiment, the anti-scalant inhibits precipitation of calcium salts.

In some embodiments, the inorganic salt or acid is added to the water before the water enters a sediment device.

In certain embodiments, the inorganic salt or acid is added to the water while the water is in a sediment device.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Various embodiments are described below. The relationship and functioning of the various elements of the embodiments may better be understood by reference to the following detailed description. However, embodiments are not limited to those explicitly described below.

In some embodiments, the present application discloses methods and compositions for reducing the hardness and/or alkalinity of water. The methods and compositions may be used to reduce water hardness, reduce the alkalinity of water, or to reduce water hardness and alkalinity.

Calcium and magnesium are the two most common minerals that cause water hardness. Hard water contains relatively large amounts of dissolved minerals, such as calcium and magnesium. In accordance with the present disclosure, "hardness" may be defined by the amount of dissolved minerals, such as calcium and magnesium, in the water. The higher the amount of dissolved calcium and/or magnesium, the harder the water.

Water alkalinity refers to the ability of water to neutralize acid. Alkalinity of water may be influenced by the presence of one or more ions, such as hydroxides, carbonates, and/or bicarbonates.

In some embodiments, the water to be treated by the disclosed compositions contains residual anti-scalant, meaning at least one anti-scalant compound has previously been added to the water. Treating the water may comprise, for example, adding a composition capable of delivering a phosphate ion or a fluoride ion to the water. The composition may comprise an inorganic salt or an acid, for example.

The anti-scalant compounds useful in connection with the present disclosure include anti-scalants for inhibiting the precipitation of calcium salt. Such calcium salt precipitation may comprise, for example, calcium carbonate, calcium sulfate, calcium phosphate, and/or calcium oxalate.

In some embodiments, the anti-scalant compound may comprise an organic phosphorus scale inhibitor and/or a poly carboxylic acid scale inhibitor. The organic phosphorus scale inhibitor may comprise, for example, organic phosphorus acids, such as 1-hydroxy ethylidene-1,1-diphosphonic acid, 2-phosphonobutane-1,2,4-tricarboxylic acid, amino trimethylene phosphonic acid, and salts thereof, such as sodium salts, potassium salts, and/or ammonium salts. The poly carboxylic acid scale inhibitor may comprise, for example, homopolymers of maleic acid, acrylic acid, methylacrylic acid, epoxysuccinic acid, copolymers comprising any one or more of the foregoing acids, and salts thereof, such as sodium salts, potassium salts, and/or ammonium salts.

In some embodiments, the inorganic salt of the composition may be selected from the group consisting of sodium salts and potassium salts of compounds capable of producing free phosphate or fluoride ion. In certain embodiments, the inorganic salt may be selected from the group consisting of sodium phosphate, disodium phosphate, monosodium phosphate, sodium fluoride, potassium phosphate, dipotassium phosphate, monopotassium phosphate, potassium fluoride, and any combination thereof. In some embodiments, the acid of the composition is phosphoric acid.

The cation of the inorganic salt or acid may not be important for the reduction of the hardness and/or alkalinity of the water. Instead, the present inventors discovered that the phosphate or fluoride ion freed from the inorganic salt or acid plays an important role.

The amount of the composition added to the water will vary depending upon the type of water system, the chemistry of the water to be treated, etc. In some embodiments, about 1 ppm to about 500 ppm, based on the weight of the water, of the inorganic salt and/or acid is added to the water. In some embodiments, about 200 ppm to about 400 ppm, about 20 ppm to about 100 ppm or about 40 ppm to about 60 ppm of the inorganic salt and/or acid is added to the water. A person of ordinary skill in the art may select a suitable dosage range or dosage value according to the actual condition of the water and the desired technical effect.

While embodiments have been described where a composition is added to water for purposes of treating the water, certain embodiments of the present disclosure also contemplate the addition of a flocculant to the water to be treated. The flocculant is added in addition to the composition comprising the inorganic salt or acid. The dosage of the flocculant can be selected based on the type of water to be treated, the chemistry of the water, etc. For example, in some embodiments, about 1 ppm to about 25 ppm, about 1 ppm to about 10 ppm, about 1 ppm to about 5 ppm or about 1 ppm to about 3 ppm of flocculant is added to the water. The flocculant may be added before the composition, after the composition, and/or with the composition. In some embodiments, the flocculant may comprise anionic and/or cationic PAM.

The compositions disclosed herein are useful to treat any type of water. For example, the compositions may be used to treat water contained in a water system, such as a gasification black water system, a cooling tower water system, a boiler water system, or a reverse osmosis water system. In certain embodiments, the gasification black water system may be a gasification black water system from the coal gasification industry.

The temperature of the water to be treated can vary. For example, the compositions and methods disclosed herein can be used to treat boiler water and/or cooling water. In some embodiments, the water comprises a temperature from about 0° C. to about 250° C., from about 0° C. to about 100° C., or from about 100° C. to about 250° C.

The point of addition of the composition capable of delivering a phosphate ion or a fluoride ion (and optional flocculant) to the water is not particularly limited and can be selected depending upon the type of water system to be treated. In some embodiments, the composition is added before the water enters a sediment device in a gasification process. In some embodiments, the water system is a gasification black water system from the coal gasification industry. In such embodiments, the composition may be added to the water before it enters a sediment device and/or it may be added to the water in the sediment device. In still further embodiments, the composition may be added directly to a cooling tower system or to any of the devices/locations shown in FIG. 1.

FIG. 1 is a diagram showing typical components used in a gasification process. Reference numeral 1 is a furnace, such as a Texaco furnace, 2 is a water scrubber, 3 is a medium flash tank, 4 is a medium flash separation tank, 5 is a vacuum flash tank, 6 a is vacuum flash separation tank, 7 is a grey water tank, 8 is a sediment tank, 9 is a pressure filter, 10 is a coal grinder, 11 is a coal slurry tank, 12 is a lock-hopper, 13 is an ash tank, 14 is a lock-hopper washing water tank, 15 is a grinding water tank, 16 is a high pressure coal slurry pump, 17 is a grinding water tank, 18 is an ash tank pump, 19 is a lock-cycling pump, 20 is a washing tower cycling pump, 21 is a condensate pump, 22 is a sediment tank feeding pump, 23 is a high pressure grey water pump, 24 is a low pressure grey water pump, 25 is a vacuum pump, and 26 is an oxygen-removal pump.

In FIG. 1, A is oxygen, B is raw coal, C is additive, D is waste water, E is fresh water, F is salt-removing water, G is steam, H is changing condensate, I is synthetic gas, J is flash torch, K is flocculant, L is fine ash, M is coarse slag, N is water discharge to the wastewater workshop.

In some embodiments, the flocculant may be added to the pipe from the sediment tank 8 to the grey water tank 7 and/or to the pipe from the grey water tank 7 to the high pressure grey water pump 23. As mentioned above, the composition capable of delivering a phosphate ion or a fluoride ion may be added to any component or location shown in FIG. 1, such as at location C, to sediment tank 8, to any location or component that the water contacts before it arrives at sediment tank 8, etc.

The present inventors discovered that the inorganic salt or acid capable of producing free phosphate or fluoride ion is able to act as a "softener" for the reduction of hardness. The inventors also discovered that the inorganic salt or acid can induce extra precipitation of calcium, which can be removed in the sediment device of the process, for example.

Anti-scalant compounds generally have no effect on $CaF_2$, but the inventors determined that the addition of a fluoride ion leads to precipitation of the calcium ion. As for phosphate ions, the concentration these ions is generally relatively low (e.g., <5 ppm), and the inventors discovered that the calcium ion may be effectively reduced by introducing phosphate ions. Meanwhile, the precipitation rate of calcium phosphate is greater than that of calcium carbonate, which facilitates the precipitation of calcium. Phosphate ions are thus more suitable and efficient than carbonate ions. Therefore, compared with common softeners, such as $Ca(OH)_2$ or sodium carbonate, the inorganic salt or acid capable of producing a free phosphate ion or a free fluoride ion is more effective for the coal gasification industry or other water systems where the water contains residual anti-scalant.

Furthermore, the inventors discovered that even though the black water generally contains residual anti-scalant, which is thought to be efficient for inhibiting the scaling of $CaCO_3$, calcium sulfate, calcium phosphate or calcium oxalate, the examples of the present application indicate that phosphate or fluoride ion can further effectively facilitate the precipitation of calcium carbonate while forming the corresponding calcium phosphate or calcium fluoride.

EXAMPLES

In the following examples, calcium was tested using an ICP (Inductive Coupled Plasma Emission Spectrometer). The testing method was APHA 3120B (APHA is an abbreviation for American Public Health Association). Alkalinity was tested using titration, and the testing method code was APHA 2320B.

Example 1

Figure 2:
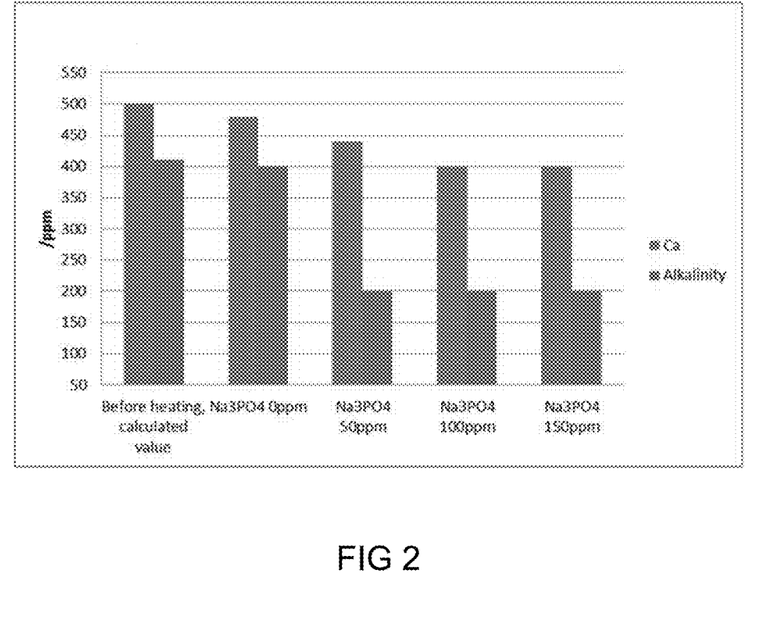
FIG. 2 is a bar graph showing calcium/alkalinity reduction effects.

Synthetic water for test was prepared by adding 5 ppm of N71363 (16% PBTC(2-phosphonobutane-1,2,4-tricarboxylic acid)+24% HEDP(1-hydroxy ethylidene-1,1-diphosphonic acid), 1388 ppm of $CaCl_2$ and 688 ppm of $NaHCO_3$ to the deionized water under mixing. Based on this, the initial hardness and alkalinity of the water, before heating, can be calculated. In FIG. 2, for example, hardness and alkalinity are based on this calculation. Samples were heated to about 80° C. (which is similar to the water temperature in a sediment tank for coal gasification industry).

Under stirring, different amounts of $Na_3PO_4$ (0 ppm, 40 ppm, 50 ppm, 100 ppm and 150 ppm) were dosed to the synthetic water samples. Then, the samples were maintained at about 80° C. for about 1.5 hours for settling. The "ppm" is calculated by the weight of the deionized water.

After cooling, all the samples were analyzed for Ca hardness and alkalinity detection. The results are shown in FIG. 2. The experimental formulated water sample in FIG. 2 is a synthetic water sample without adding $Na_3PO_4$.

It can be seen that with the addition of $Na_3PO_4$, calcium can be reduced from about 480 ppm to about 440 ppm and 400 ppm (as Ca) for 50 ppm and 100 ppm of $Na_3PO_4$, respectively.

According to the reaction equation for reacting the calcium ion and the sodium phosphate to produce calcium phosphate precipitation, theoretically, 1 ppm of $Na_3PO_4$ can only remove 0.37 ppm of Ca, and thus 100 ppm of $Na_3PO_4$ can only remove 37 ppm of Ca, in theory.

However, the lab test results indicate that calcium was reduced in different ways. In addition to the formation of $Ca_2(PO_4)_3$ precipitation, extra $CaCO_3$ precipitation was induced with the addition of $PO_4^{3-}$, even though $CaCO_3$ anti-scalant N71363 was present in the system.

This was further supported by the alkalinity data. As shown in FIG. 2, the total alkalinity of the sample was reduced from 400 ppm to 200 ppm (in $CaCO_3$). It should be noted that further reduction of hardness/alkalinity was limited while $Na_3PO_4$ (150 ppm) was further added.

Example 2

Figure 3A:
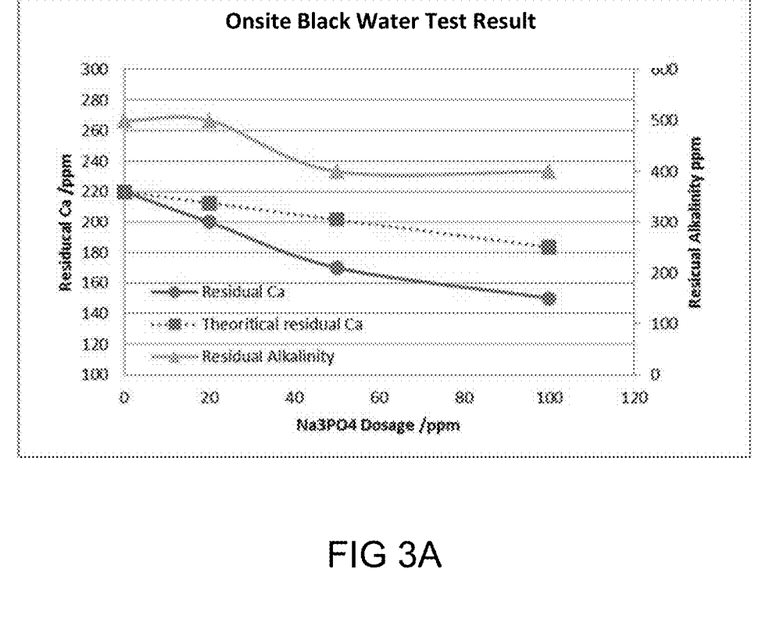
FIG. 3A is a graph showing a decrease of calcium and alkalinity.
Figure 3B:
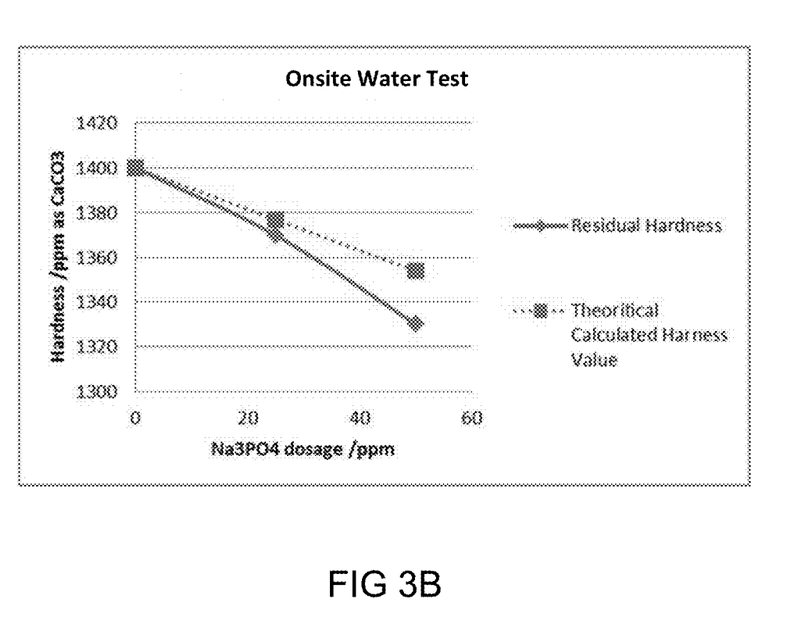
FIG. 3B is a graph showing a decrease in water hardness.

The same test as Example 1 was carried out, except that the water samples were taken from Site 1 and Site 2 of a coal gasification process and the dosage of sodium phosphate was different. The anti-scalant of the Site 1 was 2-phosphonobutane-1,2,4-tricarboxylic acid and the residual amount was about 2.2 ppm (in $PO_4$). The anti-scalant of the Site 2 was 1-hydroxy ethylidene-1,1-diphosphonic acid and the residual amount was about 3.9 ppm (in $PO_4$). The test results are shown in FIGS. 3A and 3B. The "ppm" is calculated by the weight of the water sample.

Similar to the result in Example 1, the residual Ca values are apparently lower than theoretical Ca values, which can be calculated from the precipitation of $Ca_3(PO_4)_2$. The results indicate that the addition of $Na_3PO_4$ can induce extra precipitation of $CaCO_3$ for onsite water samples, which makes the $Na_3PO_4$ softening process more economical for onsite application.

FIG. 3A shows the actual decrease of calcium and alkalinity of the onsite black water sample from the Site 1 after treatment with the $Na_3PO_4$ and the calculated theoretical decrease of Ca. FIG. 3B shows the actual decrease effect of hardness of the onsite black water sample from the Site 2 after treatment with $Na_3PO_4$ and the theoretical decrease effect.

Example 3

The same test as Example 1 was carried out, except that the water samples were taken from the black water of the Site 3 of a coal gasification process and the inorganic salt added was sodium fluoride. The anti-scalant of the Site 3 was polyacrylic acid and the residual amount was about 4.8 ppm (in polyacrylic acid). The test results are shown in FIG. 4.

Figure 4:
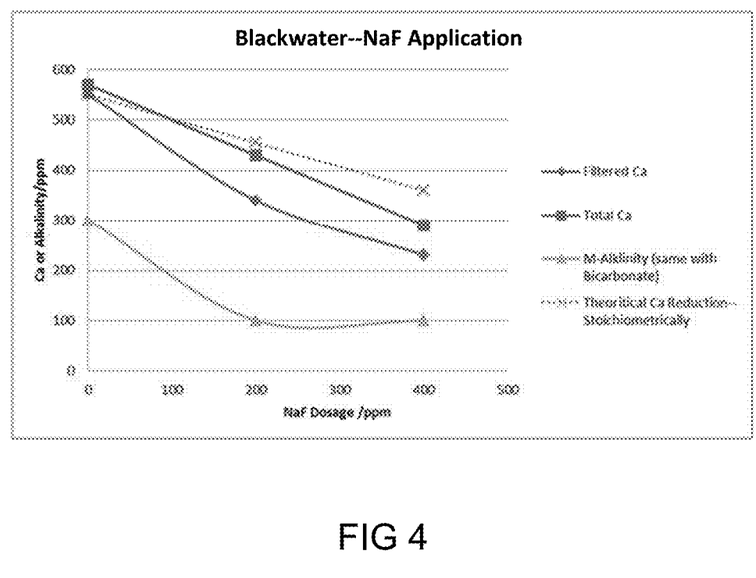
FIG. 4 is a graph showing residual calcium concentration, residual total alkalinity and a theoretically calculated residual calcium concentration.

It can be seen from FIG. 4 that, similar to $Na_3PO_4$, NaF can also reduce calcium hardness with higher efficiency than theoretical calculated values, wherein the theoretical calculated reduction of the calcium is removed only by $CaF_3$ precipitation. Alkalinity reduction indicates that NaF can also induce extra $CaCO_3$ precipitation during the softening process.

Example 4

In an additional experiment, a softening process was carried out in jars. The water sample used in each jar was from Site 1. To a first jar was added about 3 ppm PAM. To a second jar was added about 3 ppm PAM and about 50 ppm $Na_3PO_4$. To a third jar was added about 3 ppm PAM and about 100 ppm $Na_3PO_4$.

It was found that when $Na_3PO_4$ was not added (such as in the first jar), the flocs/sludge were black in color, mainly coal cinders. It was also observed that with the addition of $Na_3PO_4$, some white precipitates form in the sludge, which were thought to be $CaCO_3/Ca_3(PO_4)_2$. The results indicated that the addition of a suitable amount of sodium phosphate or sodium fluoride can induce the alkalinity reduction and hardness reduction. The results also indicated that, in the black water cleaning process, phosphate salt or fluoride can induce the precipitation of $CaCO_3$ and $Ca_3(PO_4)_2/CaF_2$.

The reduction of hardness and alkalinity will reduce the scaling stress for black water, and thus the system scaling will be relieved and heat exchange efficiency can be improved. Additionally, the reduction of calcium scaling will make the pipe cleaning easier and cause the system to require a lower amount of anti-scalant.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a compound" is intended to include "at least one compound" or "one or more compounds."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of reducing the hardness and/or alkalinity of water, comprising:
    adding a composition capable of delivering a fluoride ion and a phosphate ion to the water of a gasification black water system, wherein the composition comprises sodium fluoride or potassium fluoride, wherein the water comprises an organo-phosphorus anti-scalant in an amount greater than 0 to about 20 ppm, and
    adding a flocculant to the water, wherein the flocculant is a polyacrylamide,
    wherein the gasification black water system comprises
        a furnace,
        a water scrubber that receives gas from the furnace,
        a medium flash tank that receives the water from the water scrubber,
        a vacuum flash tank that receives the water from the medium flash tank,
        a sediment tank that receives the water from the vacuum flash tank,
    wherein theسدium fluoride or the potassium fluoride and the phosphate ion is added to the water in an amount totaling 40 to 60 ppm before the sediment tank or into the sediment tank,
    wherein the polyacrylamide is added before the sediment tank or into the sediment tank.

2. The method of claim 1, wherein the flocculant is added before, after, and/or with the sodium fluoride or the potassium fluoride.

3. The method of claim 1, wherein an amount of the flocculant added to the water is from about 1 ppm to about 5 ppm.

4. The method of claim 1, wherein the polyacrylamide is anionic and/or cationic.

5. The method of claim 1, wherein the sodium fluoride or the potassium fluoride is added to the water before the water enters a sediment device.

6. The method of claim 1, wherein the sodium fluoride or the potassium fluoride is added to the water while the water is in a sediment device.

7. The method of claim 1, wherein phosphate ion is added in the form of an inorganic salt, and the inorganic salt is selected from the group consisting of sodium phosphate, disodium phosphate, monosodium phosphate, potassium phosphate, dipotassium phosphate, monopotassium phosphate, and any combination thereof.

8. The method of claim 7, wherein the inorganic salt is sodium phosphate or potassium phosphate.

9. The method of claim 1, wherein the phosphate ion is added as an acid, and the acid is phosphoric acid.

10. The method of claim 1, wherein the anti-sealant is 2-phosphonobutane-1,2,4-tricarboxylic acid.

* * * * *

UNITED STATES PATENT AND TRADEMARK OFFICE
CERTIFICATE OF CORRECTION

PATENT NO. : 10,889,518 B2
APPLICATION NO. : 15/646445
DATED : January 12, 2021
INVENTOR(S) : Yue Ming Zhou et al.

It is certified that error appears in the above-identified patent and that said Letters Patent is hereby corrected as shown below:

On the Title Page

Column 2, Item (56) (OTHER PUBLICATIONS), Line 1, delete "NMWR" and insert -- MMWR --.

In the Claims

Column 8, Line 49, Claim 10, delete "anti-sealant" and insert -- anti-scalant --.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*